(12) United States Patent
Singh

(10) Patent No.: US 6,405,035 B1
(45) Date of Patent: Jun. 11, 2002

(54) SYSTEM AND METHOD FOR FORWARDING MESSAGES TO A SUBSCRIBER DEVICE

(75) Inventor: Mona Singh, Cary, NC (US)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 0 days.

(21) Appl. No.: 09/645,390

(22) Filed: Aug. 24, 2000

(51) Int. Cl.⁷ ................................................ H04M 3/42
(52) U.S. Cl. ........................ 455/414; 455/417; 455/466; 455/461
(58) Field of Search .............................. 455/413, 445, 455/414, 426, 552, 458, 466, 412, 427, 417, 415, 416, 461; 370/390, 432; 709/203, 240, 206, 207

(56) References Cited

U.S. PATENT DOCUMENTS

| | | | | |
|---|---|---|---|---|
| 5,940,756 A | * | 8/1999 | Sibecas | 455/426 |
| 6,052,734 A | * | 4/2000 | Ito | 709/235 |
| 6,091,947 A | * | 7/2000 | Sumner | 455/413 |
| 6,134,582 A | * | 10/2000 | Kennedy | 709/206 |
| 6,178,331 B1 | * | 1/2001 | Holmes | 455/466 |
| 6,185,185 B1 | * | 2/2001 | Bass | 370/230 |
| 6,233,318 B1 | * | 5/2001 | Picard | 379/88.17 |
| 6,247,059 B1 | * | 6/2001 | Johnson | 709/237 |

FOREIGN PATENT DOCUMENTS

WO          WO 97/37499          10/1997

* cited by examiner

Primary Examiner—Lester G. Kincaid
Assistant Examiner—John J Lee
(74) Attorney, Agent, or Firm—Coats & Bennett, P.L.L.C.

(57) ABSTRACT

A method and system of forwarding messages to a subscriber. The invention includes a host server for receiving messages from a communications network. The message is forwarded to at least one of a plurality of devices associated with the subscriber. The host server will receive a signal from one of the devices indicating that the subscriber has received the message. After receiving this signal, the message is deleted from the other devices to which it was sent to ensure redundant messages are not received by the subscriber. The invention may use a multi-cast, probabilistic, or hybrid approach to deliver the messages to subscriber on a convenient device.

13 Claims, 4 Drawing Sheets

SYSTEM AND METHOD FOR FORWARDING MESSAGES TO A SUBSCRIBER DEVICE

BACKGROUND OF THE INVENTION

The present invention is directed to a system and method for routing notification messages to a subscriber and, more particularly, to a system and method for determining where a user may access a message and ensuring a subscriber receives a message in a timely manner.

Notification services are becoming more popular as persons are becoming more mobile. Timely receipt of notices can be vitally important in some circumstances. For example, timeliness is important to the subscriber who buys and sells stocks on the stock market. The subscriber will want to be notified at the time a particular stock of interest either reaches a predetermined high or low value such that the subscriber can sell or buy the stock. If this information does not reach the subscriber in a timely manner, the subscriber misses the opportunity to make a gain.

Various services exist by which teleservice subscribers may have messages forwarded to them. These services require that the subscriber indicate the various devices at which they may receive messages, and also a schedule of the times they will be within access of each device. When the service receives a message to be forwarded to the subscriber, the service accesses the device and time data stored in a database, and forwards the message to the device where the subscriber is scheduled to be. Thus, the message delivery system forwards only one message to the subscriber at the location they are to be in accordance with a previously entered schedule. A drawback of this system is the subscriber's schedule may unexpectedly change and the message will be delivered to a device that the subscriber cannot access. These changes in the schedule are often unforeseen and the subscriber does not have the opportunity to change the schedule with the service.

One existing message forwarding system delivers messages to each of the devices registered to the subscriber. A drawback of this method is the number of repetitive messages received by the subscriber that must be reviewed and deleted. By way of example, a subscriber may register a home computer, work computer, and wireless communication device. Each of these devices will be sent the message. Once received by the subscriber at one device, the subscriber must then review and delete the same messages on the other devices. This process is time consuming and frustrating for a busy subscriber. Additionally, the subscriber may inadvertently delete a message before acting on it believing it is a repeat of a previously accessed message.

SUMMARY OF THE INVENTION

The present invention is directed to a message system that forwards messages to the subscriber such that they may receive the message in a timely manner. The system directs messages through a host server to one or more devices at which the subscriber may be located. Once delivered, the system monitors whether the subscriber has received the message. The system also deletes repetitive messages from the multiple devices once the message is accessed such that the subscriber does not receive redundant messages.

In one embodiment, a multi-cast approach is used for delivering the message. Registered devices used by the subscriber are listed in a subscriber device list. When a server receives a message that is to be directed to the subscriber, the server sends the message to each of the devices registered for the particular subscriber. Message agents within each subscriber device monitor whether the subscriber has accessed the message. Once the subscriber has accessed the message, the message agent on the device signals the server of the subscriber receipt. In response, the server signals the message agent on each of the remaining devices in the subscriber's device list to indicate that the subscriber has already reviewed the message. The remaining devices can then delete the message so that repetitive messages are eliminated.

In another embodiment, a probabilistic approach is used for determining the where the subscriber is located and delivering the message a device at that location. The server receives a message that is to be forwarded to the subscriber. The server assigns a probability to each device indicating the likelihood of it being used and ranks each of the listed devices based on the probability. Probabilities can be based on a variety of factors including whether a device is active, status via a global positioning network, most recent device access, previously entered schedule, or other. The server sends a message to the device with the highest ranking. If the subscriber accesses the message at that device, a message is sent back to the server indicating receipt and the process is complete. If the subscriber does not access the message within a predetermined time period, the message is deleted from the highest ranking device, and the message is sent to the next ranked device. Again, the server monitors whether the message is received by the subscriber. If no receipt is indicated, the message is deleted and another message is sent to the next highest ranked device. This process continues until the subscriber receives the message.

Hybrid systems of the multi-cast and probabilistic approach are also contemplated and included within the present invention.

DETAILED DESCRIPTION OF THE INVENTION

The present invention is directed to a message forwarding system and method for delivering messages from a sender to a subscriber over a communications network. Messages are sent to locations where they will be received by the subscriber. Additionally, redundant messages are deleted such that the subscriber receives each message only once.

Figure 1:
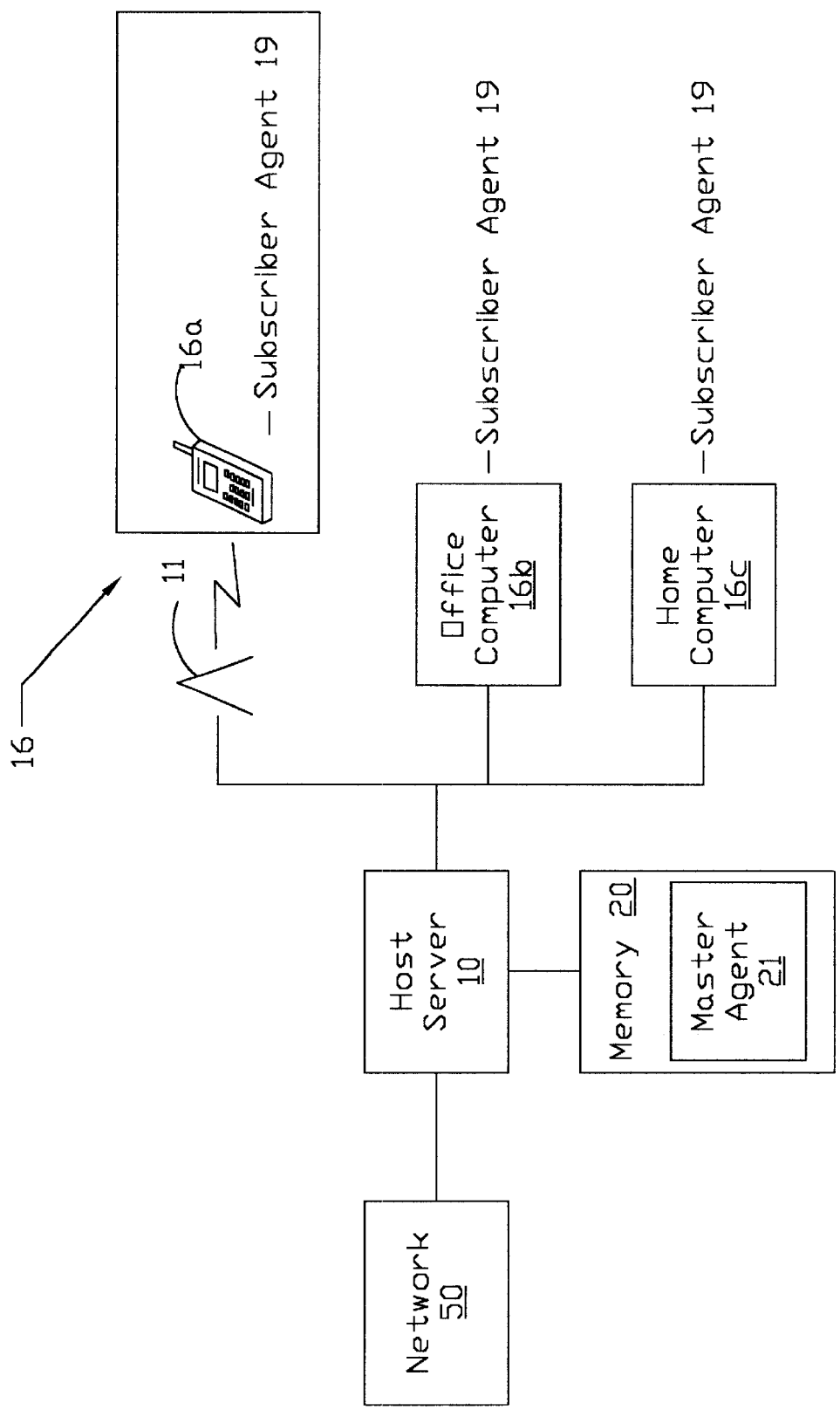
FIG. 1 is a schematic diagram of a host server in communication with a number of different subscriber devices.

FIG. 1 illustrates one embodiment of the message delivery system used in the present invention. Subscriber registers with a host server 10 each of a plurality of subscriber devices 16 that may receive messages. The subscriber devices are generally referred to as 16, and illustrated within the example of FIG. 1 as 16a, 16b, 16c which correspond to a wireless communication device 16a served by a wireless communications network 11; an office computer 16b; and a home computer 16c. It is to be understood that subscriber may have additional devices that are registered with the host server 10. Additionally, any number of different subscribers each having various subscriber devices 16 may be operatively connected to the host server 10.

Host server 10 is operatively connected to the subscriber devices 16 and a communications network 50. Host server 10 processes the message requests received from a sender through the network 50 and forwards them to the subscriber devices 16 such that subscriber will receive the message in a timely manner and at a convenient device, and will not receive redundant messages. Host server 10 may include memory 20 for storing the subscriber information and processing the sending and receipt of messages.

Software applications are contained within both the host server 10 and each of the individual devices 16 for monitoring the delivery of messages to the subscriber. In one embodiment, agents are positioned within each component and referred to as a master agent 21 stored within the host server 10, and subscriber agents 19 stored within each device 16. Subscriber agents 19 monitor the message status of each subscriber message including receipt, storage, and access of messages within each of their respective devices 16. Subscriber agent 19 further signals the information to the master agent 21. Master agent 21 monitors the status of each of the messages on each device 16 and ensures redundant messages are not accessed. Agents 19, 21 are active and persistent software components that perceive, reason, act, and communicate. Agents are disclosed in the book "Readings in Agents", edited by Michael N. Huhns and Munindar P. Singh, herein incorporated by reference in its entirety.

Host server 10 may further maintain a record of each message sent to a subscriber and the access time and date. The record may include the time the message was received by the host server from the sender, the subscriber devices 16 to which the message was forwarded, the time the message was forwarded, the amount of time the message was pending at the various devices before being accessed or deleted, and the time the message was accessed by the subscriber.

When a subscriber subscribes to the service of the present invention, subscriber provides a listing of each subscriber device 16 at which they may be contacted and address information for each device 16. This information is stored within memory 20 and is accessed by host server 10 at the time of an incoming message. The list of subscriber devices 16 may be contained, for example, within a subscriber database. In one embodiment, subscriber may also provide a tentative schedule of the times they will be using each device 16. This increases the likelihood that the host server 10 will be able to contact the subscriber at the time a message is received. By way of example, subscriber may input a schedule of devices at which they can be reached such as weekdays at the wireless communication device 16a between 8:00 am–9:00 am, and 5:00 pm–6:00 pm which corresponds to a drive to and from work, at the office computer 16b between 9:00 am and 5:00 pm, and at the home computer 16c between 6:00 pm and 9:00 pm.

In one embodiment, host server 10 also maintains the current status of each subscriber device 16. An active device is one which the subscriber is currently logged on to and using such that it may receive messages. Conversely, a non-active device is one which the subscriber has not activated and cannot currently receive messages. Each subscriber may have any number of active and non-active devices at a given instant in time. A subscriber device 16 may change from active to non-active status if the host server 10 receives a signal indicating the subscriber has turned off the power to the device 16, or if the device 16 has not be used within a predetermined period of time.

Host server 10 may also prioritize messages that are addressed to a subscriber. In one embodiment, the sender may indicate the priority level within the message. In another embodiment, subscriber provides a list of potential senders to the host server 10 and the priority level that is to be attached to each message originating from the sender. This information is accessed by the host server 10 at the time a message is received from the sender and the appropriate priority level is placed on the message.

Network 50 is a communications network through which messages and information may be passed between remote users. One example of a network is the Internet. More specific descriptions and embodiments of the components of the present invention are contained and discussed below.

Figure 2:
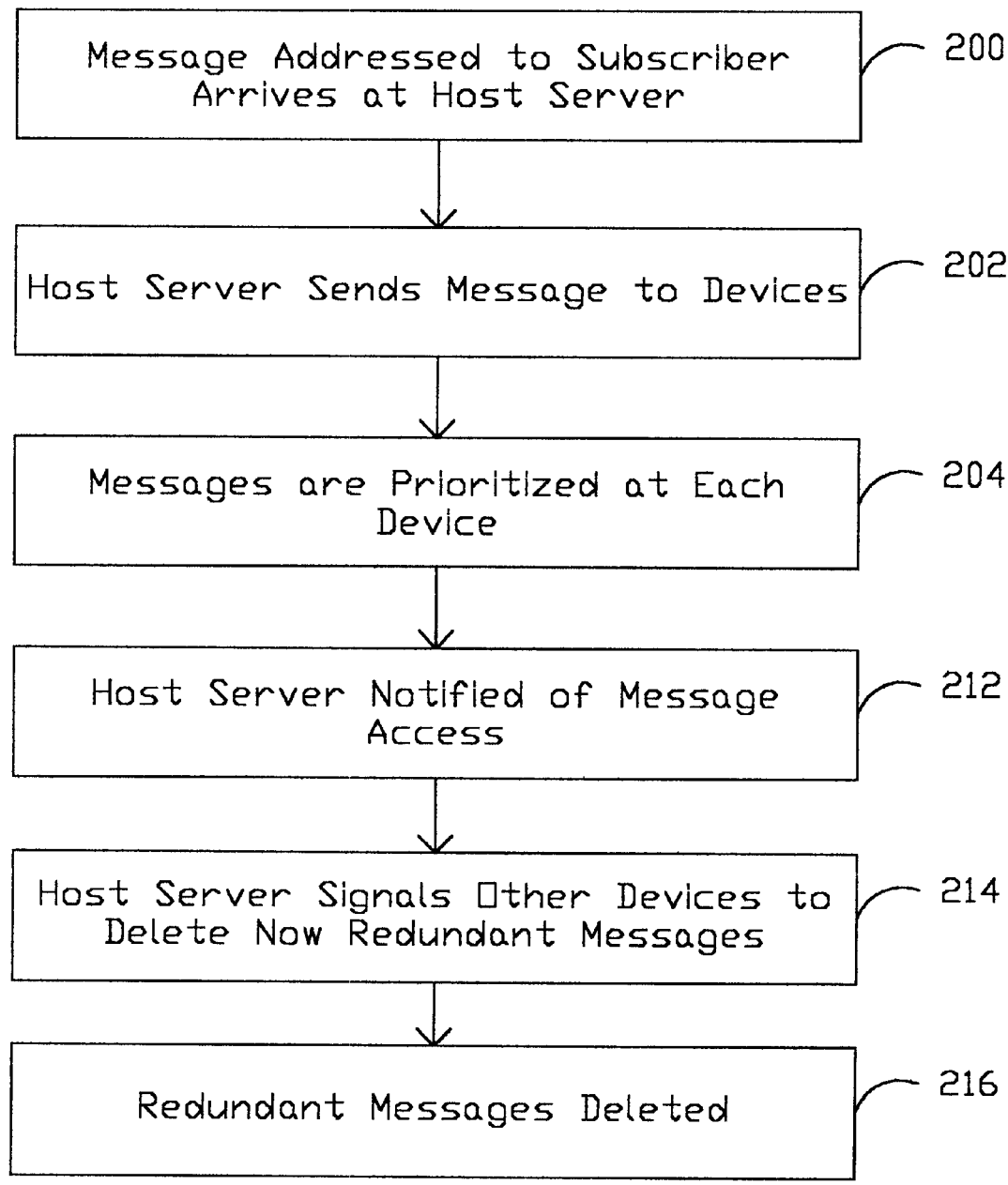
FIG. 2 is a flowchart illustrating an exemplary method for delivering a message to the subscriber and using a multi-cast approach.

FIG. 2 illustrates the steps of one a multi-cast forwarding scheme in which the message is forward to a plurality of devices 16 at one instant in time. After receipt by the user at one of the devices 16, the message is deleted from the remaining devices 16 such that the subscriber does not receive redundant messages. At the time of subscription, subscriber provides information including a listing and address of each device 16 at which they may receive messages. After the subscriber has subscribed to the system, the host server 10 receives a message addressed to the subscriber (block 200). Host server 10 accesses the subscriber information from memory 20 indicating which subscriber devices 16 the subscriber receives messages and sends the message to each of the addresses (block 202). Host server 10, and in particular the master agent 21, may send the message to each of the indicated addresses, or may send the message to each device 16 that is currently active.

At the device level, the message is received and subscriber agent 19 prioritizes the message relative to the other pending messages (block 204). Priority may be based on the time of message receipt, the priority level placed on the message by the host server 10, or other. Therefore, when subscriber reviews the pending messages, the messages are listed in a priority level which is more convenient for the subscriber to determine which messages require a response and which messages may not be as important and may be reviewed at a later time. Once the subscriber has accessed the message at one of the devices 16, the subscriber agent 19 signals the master agent 21 (block 212).

Upon receipt of the message received signal from one of the subscriber agents 19, master agent 21 signals each of the other subscriber agents 19 to delete the now redundant message (block 214). These messages are then deleted such that the subscriber does not see the same message more than once (block 216).

Illustrating this method using the elements of FIG. 1, host server 10 receives a message addressed to the subscriber. Host server 10 accesses the subscriber information from memory 20 and invokes master agent 21 to send the message to each of the listed subscriber devices 16a, 16b, 16c. Each of the subscriber agents 19 at each device 16 prioritizes the message with other currently pending messages. The subscriber accesses the message at one of the devices 16, by way of example wireless communication device 16a. The subscriber agent 19 at the wireless communication device 16a signals receipt of the message access to the master agent 21. Master agent 21 then signals the remaining subscriber agents 19 at the office computer 16b and the home computer 16c to delete the message. In this manner, subscriber receives the message in a timely manner, and only sees the message once. Host server 10 may also keep a log of each message delivered to the subscriber and include information such as when the message was delivered, when accessed by the subscriber, etc. In another embodiment, the subscriber agents 19 may communicate amongst themselves in addition to communicating with the master agent 21. Therefore, upon message receipt, subscriber agent 19 at the wireless communication device 16a may signal the subscriber agents 19 at the office and home computers 16b, 16c to delete the message.

Figure 3:
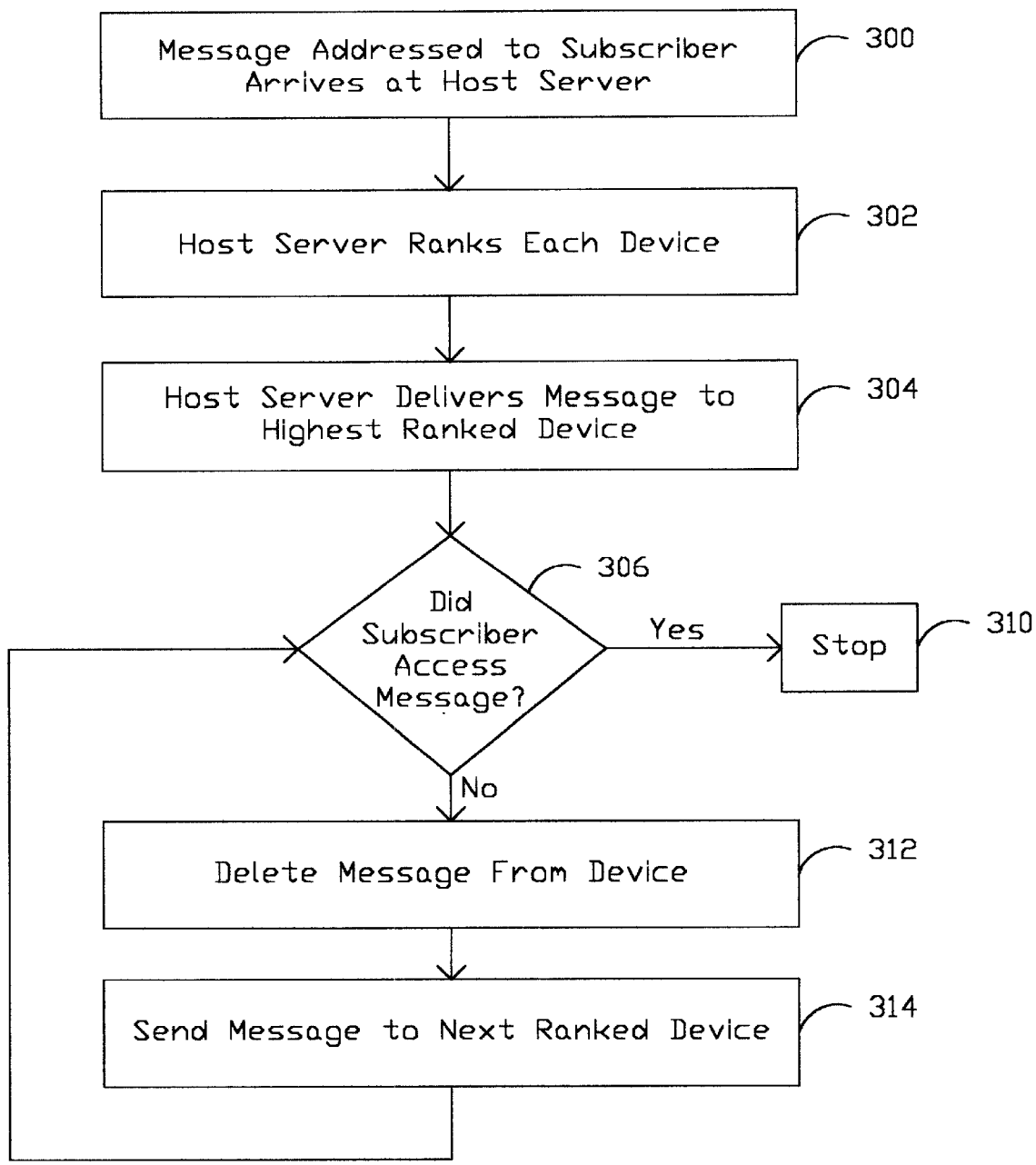
FIG. 3 is a flowchart illustrating a second exemplary method for delivering a message to the subscriber in a probabilistic approach.

FIG. 3 illustrates a probabilistic approach for message delivery that determines the most probable location of the subscriber and sends the message to a device at the location. Host server 10 receives a message addressed to the subscriber (block 300). At the time of message receipt, host server 10 ranks each of the devices 16 registered by the subscriber to determine which has the highest probability that the subscriber will receive the message (block 302).

Various methodologies are used for determining the location of the subscriber. In one embodiment, subscriber provides a schedule of the times at which they will be working on each device 16. Host server 10 delivers the message to the device 16 indicated at the time of message receipt. Another embodiment includes the host server 10 tracking the receipt of each message by the subscriber. When a message is accessed at a particular subscriber device 16, the host server 10 will direct the next message to the same device 16. Closely related, if messages are often accessed from a particular device 16 within a particular time frame, the host server 10 will deliver the message to that device first. By way of example, if messages are often received by the subscriber at their home computer 16c after 10 pm, the host server 10 will send the message to that address first before sending the message to other devices 16.

Another ranking method is to prioritize each of the active subscriber devices 16 at the time the message is received. By way of example, host server 10 and master agent 21 may assign the wireless communication device 16a with the highest likelihood that the message will be received because many subscribers carry the device 16a with them when it is activated. Office computer 16b may have the second highest priority because although it is active, many subscribers often do not constantly use the device 16b and a message may languish there without being accessed.

Host server 10 may also rely on a global positioning system for determining a priority for each device 16. Wireless communication network 11 is able to determine the geographic position of a device as it moves between base stations within the network. Host server 10 may access the geographic positioning information from the wireless communication network 11 to infer whether the subscriber is currently at the device location. When the device is activated and moving throughout the network 11, host server 10 infers that the user is at the device location and assigns a higher priority to the device 16. For example, a subscriber with a wireless communication device 16a as they drive about their hometown. This prioritization scheme may not be applicable to static devices, such as the office computer 16b and home computer 16c.

The subscriber may also determine at which of the devices 16 messages are to be received. Subscriber may instruct host server 10 to deliver messages having at least a certain priority to specific devices. If a message does not have the priority level, the host server 10 and master agent 21 sends the message to another device. By way of example, the subscriber may take the wireless communication device 16a into a meeting. Prior to the meeting, subscriber instructs the host server 10 to only send messages with a high priority level to the device 16a, and to send the remainder of the messages to another device.

After ranking each of the devices 16, master agent 21 delivers the message to the highest ranked device (block 304). The message will remain pending at the device 16 for a predetermined period of time waiting to be accessed by the subscriber (block 306). If the subscriber accesses the message, the subscriber agent at the device signals the master agent 21 and the process is terminated (block 310). If the message is not accessed within the time period, subscriber agent 19 signals the non-accessed message status to the master agent 21 and the message is deleted from the device 16 (block 312). Master agent 21 then sends the message to the next ranked device 16 (block 314). If the message is accessed, the process is terminated (block 310). If the message is not accessed, the process continues until the subscriber receives the message.

Hybrid variations combining attributes of the multi-cast and focused approach may also be used. By way of example, each device 16 may be ranked and the top two devices 16 are sent messages with the redundant message being deleted upon receipt by one of the devices 16. Another example includes sending the message to the highest ranked device 16 and waiting the predetermined time period. If no answer occurs, leave the message pending at that device 16, and send a redundant message to the next ranked device 16. This continues until the subscriber accesses the message, at which time redundant messages are deleted.

Messages addressed to the subscriber may have a variety of forms including but not limited to electronic mail (email) messages, instant messages, and short message service (SMS) messages. Email messages arrive at the host server 10 and are forwarded via email programs such as Microsoft Outlook, stored within each of the subscriber devices 16. Subscriber devices 16 periodically poll the host server 10 to pick up messages directed to them. Instant messaging allows users to create affinity groups and check the status of and send messages to other group members. Instant messaging software loaded onto the subscriber devices 16 may include iPulse created by Oz.com, or Yahoo Pager. SMS gives subscribers audible and written messaging capabilities for receiving information. The present invention may use one or more of these delivery systems to send and receive messages. These message formats and system support are discussed in U.S. patent application Ser. No. 09/514,657, herein incorporated by reference in its entirety.

Figure 4:
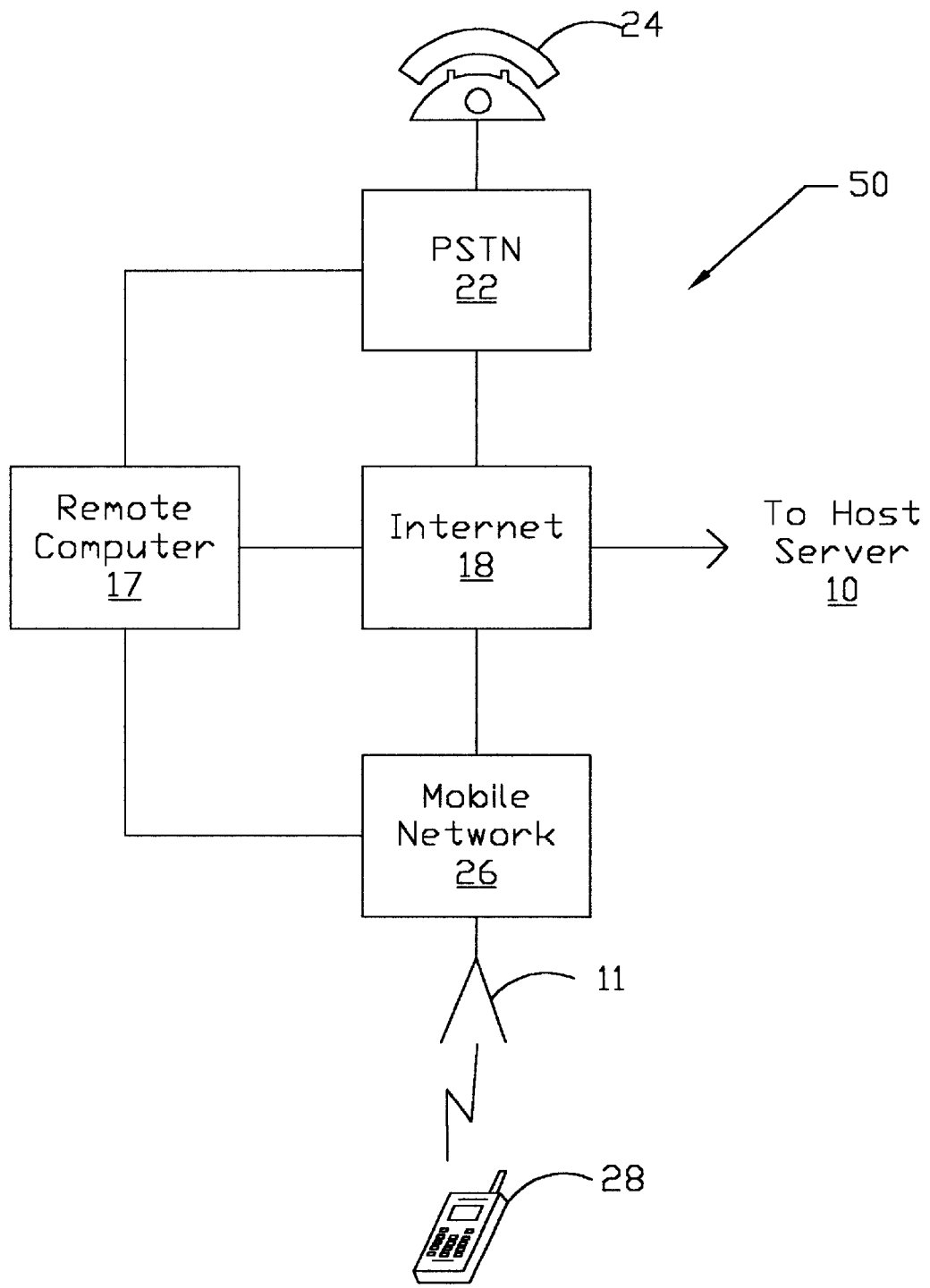
FIG. 4 is a schematic diagram illustrating one embodiment of a communications network through which a sender may send a message addressed to a subscriber.

FIG. 4 illustrates one embodiment of the communications network 50. In this embodiment, host server 10 is directly connected to the Internet 18. Messages are input by a sender through various devices and directed through the Internet 18 to the host server 10. In an alternative embodiment not illustrated, a sender server may provide access for the host server 10 to the Internet 18. Sender server may be an Internet Service Provider, such as BELLSOUTH.NET™, GTE.NET™, or the like. In this alternative, host server 10 serves as a "local" gateway through which the subscriber accesses the sender server and from there accesses the Internet 18. One skilled in the art will understand that a variety of different architectures may be used in the present invention.

Individuals or entities wishing to communicate to the subscriber may originate messages at any number of locations. What follows is a discussion of accessing the Internet 18 which in turn passes the communication on to the host server 10. It should be appreciated that the same connections may be made in embodiments with a sender server. Internet 18 may be accessed directly by an individual through a conventional input/output interface such as remote computer 17 having a keyboard, monitor, and mouse with access being obtained over a dedicated communications link. An individual may instruct the remote computer 17 to access the Internet 18 and provide appropriate log in information or other desired access information. This connection may be a wire-based or wireless connection as needed or desired.

Alternatively, the remote computer 17 may indirectly access the Internet 18 through a modem (not shown) and network. As noted, appropriate login information may be required. Again, this access may be wire-based or wireless. If wire-based, this connection may occur over the Public Switched Telephone Network (PSTN) 22. If wireless, the connection may be made with a wireless modem over the mobile network 26.

While modems are considered, some computers 17 may be able to connect to remote locations without the need for a modem. Ethernet connections or similar arrangements may be made. In such instances, the remote computer 17 may be connected to the Internet 18, perhaps through an Internet Service Provider, or perhaps through their own Internet domain.

Another manner of accessing the Internet 18 is via telephone 24 or wireless communication device 28. Telephones 24 may access the Internet 18 through the PSTN 22, and the wireless communication device 28 may access the Internet 18 through the mobile network 26. As yet another embodiment, Internet capable wireless communication devices 28 are presently being marketed by most of the major cellular phone manufacturers such as ERICSSON, assignee of the present invention. These wireless communication devices 28 and the conventional technology associated therewith allow voice and data messages to be routed through the Internet 18 as well as allowing use of the wireless communication devices 28 to view Internet based material. Other existing technology allows Internet voice communication, effectively turning the Internet 18 into a phone system for subscribers. Further, currently existing technologies allow email to be audibly communicated over phone lines and the like. All of these forms of communication are possible and contemplated as being used to facilitate the present invention.

While the Internet 18 is contemplated as the primary network by which communication between remote computer 17 and the Internet 18 is accomplished, other networks, proprietary or public could equivalently be substituted. Additionally, there are numerous networks, both satellite-based and terrestrial that may be combined to create such a network. Such subsidiary networks could comprise the mobile network 26, the PSTN 22, a cable network, or the like. The physical network connection for sender server 12 and the remote computers 17 could be wired connections, such as telephone lines, digital subscriber lines, TV cables, fiber-optic links, and the like, and/or wireless connections, such as microwave, cellular, radio, satellite links, and the like. In short, while described as a discrete network, a remote computer 17 may communicate dynamically over any and all of these subnetworks, potentially without the individual being aware of the exact nature of the communication.

It is contemplated that the remote computers 17 will be personal computers with the appropriate communications software, although as WEB-TV and other existing services attempt to shift the need from client processing power to server provided processing power, the present invention accommodates such alternate devices as well.

As used herein, the term "wireless communication device" may include a cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a conventional laptop; palmtop receiver; or other appliance that includes a radiotelephone transceiver. Wireless communication devices may also be referred to as "pervasive computing" devices.

The term "computer" is defined herein as any data processing device including devices having microprocessors, conventional personal computers, personal digital assistants, and the like. The term is meant to be construed broadly.

Host server 10 may be a personal computer with a microprocessor therein, may be a dedicated network server, or the like as needed or desired, and includes memory 20. Memory 20 may be a hard drive, flash memory, EEPROM, CD-ROM, optical CD, floppy disk, DVD-ROM, magnetic tape, or other form of computer memory as is well understood in the field of computers. Software 21 includes applications programmed to have the functionality of the present invention and may be written in any appropriate code as needed or desired.

Host server 10 may have a variety of embodiments depending upon the requirements of the system. It should be appreciated that the structure of the host server 10 is provided as an example, and is not intended to be limiting. In one embodiment, host server 10 is a centralized computer at one physical location. In another embodiment, the host server 10 could be a distributed system with multiple computer systems, each located at one physical location, linked together through a local area network (LAN). Each of the computer systems performs part of the tasks accomplished by a centralized host server system.

In yet another embodiment, the host server 10 could be a distributed system with multiple computer systems scattered across a number of physical locations, but linked together through a wide area network (WAN). Each of the computer systems may also perform only one part of the tasks of a centralized host computer system.

In a third embodiment, the host server 10 could in fact be redundant servers, each capable of supporting the present invention. Such arrangements are common for game servers like EVERQUEST, ASHERON'S CALL, and the like. In these configurations, the subscriber must log onto the appropriate server to access their account. However such architectures are well known, and a further discussion will be omitted.

It is specifically contemplated that the host server 10 may be connected to the Internet 18 or other networks at all times and therefore should be adapted to having fail safe and hot-swappable drives. This will allow continued operation even in the event of isolated failures within the system. Additionally, the software 21 may be backed-up regularly, as is well known in the industry, to recover in the event of a catastrophic failure.

The present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of forwarding messages to a subscriber, the method comprising the steps of:

receiving a message at a host server, the message being addressed to a subscriber;

forwarding the message from said host server to a plurality of devices indicated by the subscriber; and receiving a signal from one of the plurality of devices indicating that the subscriber has received the message, and, in response thereto automatically deleting the message from each of the plurality of devices to which the message was forwarded and not accessed by the subscriber.

2. The method of claim 1, wherein the message is forwarded to each of the plurality of devices at the same time.

3. The method of claim 1, wherein forwarding messages from the host server to the plurality of devices is performed according to a predetermined sequence.

4. The method of claim 3, wherein prior to the subscriber receiving the message, the message is pending at one of the devices at a given moment of time.

5. The method of claim 1, wherein the host server records each message delivered to the subscriber.

6. The method of claim 1, further including sending the message to each of the devices that are active.

7. A method of forwarding a message comprising the steps of:

receiving a message addressed to a subscriber;

delivering the message to each of a plurality of devices attributed to the subscriber; and receiving a signal from one of the plurality of devices indicating the subscriber has received the message, and, in response thereto automatically deleting the message from the other plurality of devices.

8. The method of claim 7, wherein the message is delivered to active devices.

9. The method of claim 7, further including assigning a priority level to each message sent to the plurality of devices.

10. The method of claim 7, wherein the message is in the form of at least one of a group consisting essentially of email, short message service, and instant messaging.

11. A message delivery system comprising:

a host server;

a plurality of devices each capable of receiving messages targeted to a subscriber, each of said plurality of devices being in communication with said host server;

a subscriber agent within each of said plurality of devices for maintaining the status of a message sent to the device;

a master agent within said host server for communicating with said subscriber agents and causing redundant messages to be automatically deleted by said devices at least by the time the message is accessed by the subscriber in response to receiving a signal from one of the plurality of devices indicating that the subscriber has received the message.

12. The system of claim 11, wherein said subscriber agents prioritize messages that have not been accessed by a subscriber.

13. The system of claim 11, wherein each of the devices receives messages in at least one of the forms consisting essentially of email, short message service, and instant messaging.

* * * * *